United States Patent
Horowitz et al.

(10) Patent No.: US 9,037,576 B2
(45) Date of Patent: May 19, 2015

(54) SYSTEMS AND METHODS FOR PROVIDING MEDIA ACCESS PATTERNS IN A GEOGRAPHIC AREA

(75) Inventors: Steven Horowitz, Oakland, CA (US); Jeffery Bennett, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 808 days.

(21) Appl. No.: 11/839,674

(22) Filed: Aug. 16, 2007

(65) Prior Publication Data

US 2009/0049051 A1 Feb. 19, 2009

(51) Int. Cl.
*G06F 7/00* (2006.01)
*G06F 17/30* (2006.01)

(52) U.S. Cl.
CPC .... *G06F 17/30053* (2013.01); *G06F 17/30035* (2013.01); *G06F 17/30041* (2013.01)

(58) Field of Classification Search
CPC ............ G06F 17/30867; G06F 17/30699; G06F 17/30026; G06F 17/30029; G06F 17/30772
USPC ............... 707/6, 724, 723, 104.1, 768, 784, 707/999.002
See application file for complete search history.

(56) References Cited

U.S. PATENT DOCUMENTS

| | | | |
|---|---|---|---|
| 2004/0019497 A1* | 1/2004 | Volk et al. | 705/1 |
| 2006/0149734 A1* | 7/2006 | Egnor et al. | 707/7 |
| 2006/0184972 A1* | 8/2006 | Rafey et al. | 725/80 |
| 2006/0282455 A1* | 12/2006 | Lee et al. | 707/102 |
| 2008/0064351 A1* | 3/2008 | Landschaft et al. | 455/187.1 |
| 2008/0097863 A1* | 4/2008 | Spiegelman | 705/26 |
| 2008/0155588 A1* | 6/2008 | Roberts et al. | 725/34 |
| 2008/0201315 A1* | 8/2008 | Lazier et al. | 707/5 |
| 2009/0210316 A1* | 8/2009 | Chu et al. | 705/26 |
| 2009/0210946 A1* | 8/2009 | Cohen et al. | 726/27 |

OTHER PUBLICATIONS

Real-Time Geographic Visualization of World Widw Web Traffic, Stephen E. Lamm and Danied A Reed, May 1996, Paris France, Fifth International World Widw Web conference.*

Stephen E. Lamm and Daniel A. Reed, "Real-Time Geographic Visualization of World Wide Web Traffic", Department of Computer Science, University of Illinois, Fifth international World Wide Web Conference, May 6-10, 1996, Paris France.*

Palantir: A Visual Tool for the World Wide Web, by Nektarios Papadakakis, Evangelos P. Markatos, Athanasios E. Papathanasiou, published in 1998.*

* cited by examiner

*Primary Examiner* — Mohammed R Uddin
(74) *Attorney, Agent, or Firm* — James J. DeCarlo; Greenberg Traurig, LLP

(57) ABSTRACT

Systems and methods of presenting media access patterns to a user are disclosed herein. A geographic indicator is received from a user. The geographic indicator can be representative of a geographic area. A media item identifier corresponding to a media item having the greatest number of media access requests is identified. The media access requests are received from a plurality of consumers associated with the geographic area. The media item is identified from a logging database that stores media access requests. The media item identifier can be communicated to the user.

24 Claims, 9 Drawing Sheets

SYSTEMS AND METHODS FOR PROVIDING MEDIA ACCESS PATTERNS IN A GEOGRAPHIC AREA

BACKGROUND

1. Field

This disclosure relates to online media access. In particular, this disclosure relates to systems and methods for providing media access patterns to users.

2. General Background

Media consumers are increasingly accessing media, such as music and video, through the World Wide Web, and the Internet in general. As the Internet becomes the new forum for an artist's success, media access patterns in the Internet have become more important. Record labels, artists, and media producers in general are now more focused than ever on media access of consumers on the Internet. In addition, consumers also want to know what media other consumers are listening to, viewing, and accessing online.

SUMMARY

Systems and methods of presenting media access patterns to a user are disclosed herein. Media access requests can be received for a plurality of media items. The number of requests for each media item are stored in the plurality of media items in a logging database. Each of the plurality of media items are provided to consumers requesting the media items. A geographic indicator is received from a user. The geographic indicator can be representative of a geographic area. A media item identifier corresponding to a highly-requested media item is identified. The highly-requested media item is a media item having the greatest number of media access requests from consumers in the geographic area. The media identifier is communicated to the user. The geographical indicator can be a latitude and longitude coordinate, a zip code an area code, a city, a state, or a metropolitan area. The media item is audio, video, image, or text.

In another aspect, a list of media item names can be generated. The list can be ordered based on the number of media access requests of each of the media items in the list. A playlist can be further generated based on the list of media item names.

In another aspect, a date range selection can be received from the user. The date range being can be utilized to identify the media item identifier such that the media item identifier corresponds to a highly-requested media item having the greatest number of media access requests from consumers during the date range.

In yet another aspect, a demographic filtering selection can be received from the user. The demographic filtering selection can be utilized to identify the media item identifier such that the media item identifier corresponds to a highly-requested media item having the greatest number of media access requests from consumers having demographic characteristics as provided by the demographic filtering selection.

In one aspect, there is a method of presenting media access patterns to a user. A geographic indicator can be received from a user. The geographic indicator can be representative of a geographic area. A song identifier corresponding to a song having the greatest number of media access requests from a plurality of consumers associated with the geographic area is identified. The song is identified from a logging database that stores media access requests. The song identifier can be communicated to the user.

In another aspect, there is a system for presenting media access patterns to a user, comprising a logging module, a reporting module, and a user interface module. The logging module stores media access requests in a logging database. The media access requests can be received from a plurality of consumers associated with a geographic area. The reporting module receives a geographic indicator from a user. The geographic indicator can be representative of the geographic area. The reporting module can further be configured to identify a media item identifier corresponding to a media item having the greatest number of media access requests in the logging database. A user interface module communicates the media item identifier to the user.

DRAWINGS

The features and objects of alternate embodiments of the present disclosure will become more apparent with reference to the following description taken in conjunction with the accompanying drawings of various examples wherein like reference numerals denote like elements and in which.

DETAILED DESCRIPTION

Figure 1:
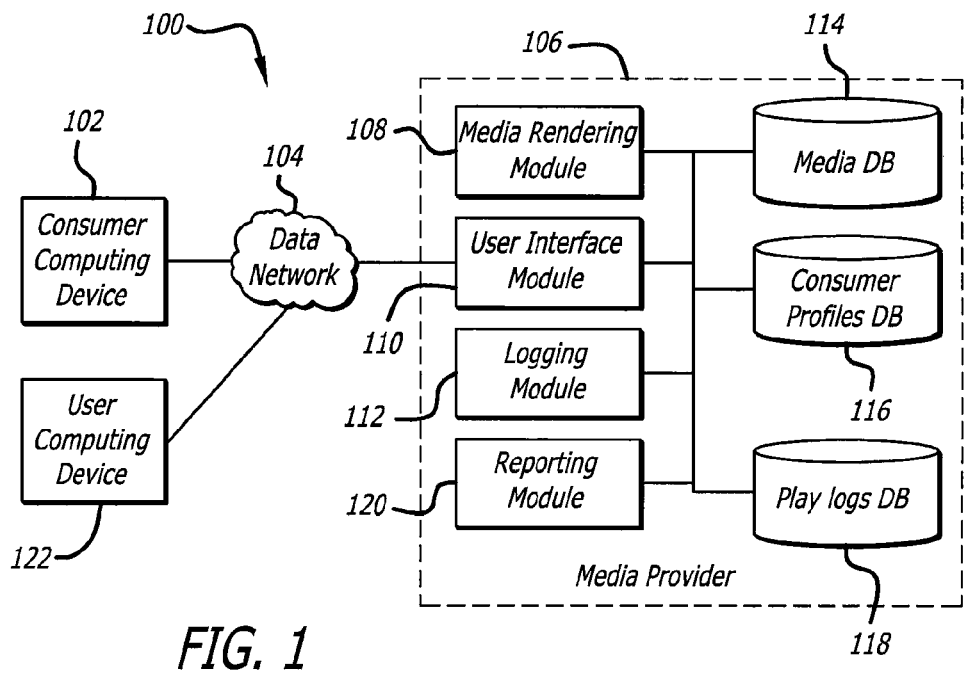
FIG. 1 depicts a system for communicating media access patterns to one or more users according to one embodiment.

The systems and methods described herein provide a user with information regarding media access patterns of a defined consumer base in a pre-selected geographic area. For example, a user can select a geographic area, such as a city, or an area corresponding to a zip code, and determine the media that consumers in the selected geographic area are reading, listening, viewing, and in general accessing. Media accessing can comprise activities such as page requests, downloading, streaming, subscribing to RSS feeds and listening to Internet radio channels, watching Internet video channels, selecting radio and TV stations, rating media, among others. As such, media accessing includes media requested via a pull mechanism such as downloading of media, as well as media requested via a push mechanism, such as RSS feeds, or radio streaming. An example of a push system is the Yahoo! Launchcast Service which streams media items, such as songs, to consumers based on consumer ratings, behavior, and preferences.

Furthermore, media as disclosed herein includes audio, video, digital news stories, etc. In addition, media access patterns can include data such as the top ten songs being listened to by consumers in the geographic area, the top albums in a specific area, etc.

Consumers as described herein are generally subscribers or entities that access media from the media provider. The media provider system can be configured to render, stream, download, and in general provide media access to the consumers. In addition, the media provider system can further be configured to track, monitor, or log media access activity by the consumer.

Users can be individuals or entities that query the media provider system in order to determine media access patterns. The user can establish parameters for searching media access patterns. For example, the user can establish a geographic area from which media access patterns are determined. In another example, the user queries media access patterns according to age, gender, ethnicity, etc. Therefore, users can be record labels, bands, producers, etc., who are interested in determining media access patterns in order to assess the success of a song, video, artist, etc. Of course, a user of the system can also be a consumer. Thus, once the user determines media access patterns, the user can turn into a consumer and request similar media from the media provider.

In addition, media playlists can be generated based on the media access patterns obtained from the media provider system. For example, a playlist of the top ten songs in a geographic area can be generated. In another example, a playlist of the top five songs in a geographic area can be generated. In yet another example, a playlist according to the top five albums or artists can be generated. For example, users can utilize the systems and methods disclosed herein to determine top songs in a geographical area, and generate a playlist that includes the determined top songs. Using the generated playlist, the user is in effect a consumer who accesses the media associated with the generated playlist. In yet another example, the generated playlist can be for any type of media item, such as videos, photos, media reviews, articles, literary works, etc.

FIG. 1 depicts a system for logging media access patterns of consumers according to one embodiment. In addition, the media access patterns can be communicated to one or more users who select a specific geographic region, periods of time and/or consumer demographics as search criteria of media access patterns.

Media access patterns can be collected and logged in multiple ways. In one embodiment, a media consumer communicates with a media provider 106 through a data network 104. The consumer can utilize a consumer computing device 102 to submit requests for media such as music or video. The consumer can further utilize the consumer computing device 102 to receive media transmitted over the data network 104 and received at the consumer computing device 102. For example, the consumer can request a music file from the media provider 106 by making a request at the interface module 110. The interface module 110 can be configured to provide one or more user interface functionalities and components that permit the consumer to input data and receive media data.

Upon a consumer requesting a media file from the interface module 110, the interface module 110 can be configured to relay the user commands to the media rendering module 108. The media rendering module 108 can be configured to access media files stored in a media database 114. Media files stored in the media database 114 can include music, video and in general media files in digital media formats currently known, or to become known in the future. Upon receiving the selection command from the interface module 110, the media rendering module 108 searches the media database 114 and retrieves the correct media files corresponding to the request by the consumer. The media rendering module 108 can be configured to further communicate with the interface module 110 so as to transmit the retrieved media file to the consumer computing device 102. In addition, the media rendering module 108 can further be configured to communicate with a logging module 112. The communication transmitted from the media rendering module 108 can comprise information related to the media requested by the consumer from the consumer computing device 102. For example, the media rendering module 108 can convey information to the logging module 112 such as title of the song or video, name of the artist, name of the corresponding album, track number, etc. In addition, the media rendering module 108 can further convey the date and time of the consumer request, and the user identifier corresponding to the consumer requesting the media file. Upon the logging module 112 receiving information indicative of the consumer identity as well as multimedia requests by the consumer, the logging module 112 can access the consumer profiles database 116 for example to supplement the data provided by the media rendering module 108 by requesting user specific information such as the geographic location of the consumer.

In one embodiment, the geographic location of the consumer is retrieved from the consumer profile at the consumer profiles database 116. For example, the media provider 106 may require a subscription or otherwise a registration process by a consumer to be able to receive media from the media provider 106. During the registration process a consumer profile must be entered by each consumer that accesses the media provider 106. Information included in the consumer profile stored at the consumer profiles database 116 can include the consumer location such as zip code information, area code information, and address, among others.

In another embodiment, the logging module 112 can record IP address, or any other identifier, of the consumer computing device 102. Known lookup tables and/or software configured to map IP addresses to geographic locations can be utilized to determine the geographic location of the consumer making the request.

Once the logging module 112 has received information regarding the media file requested by the consumer, as well as the characteristics of the media file and the geographic location of the consumer, the logging module 112 can store the collected information in the play logs database 118. Thus, the play logs database 118 stores a collection of user requests of media and corresponding information of the requested media as well as geographic information associated with each media request. As such, the play logs database 118 can be accessed by a reporting module 120 to retrieve information on media access patterns. In addition, the play logs database 118 can further include an indicator or identifier that associates each media request with a consumer profile. A reporting module 120 can then access the consumer profiles database 116 associated with each play request stored in the play logs database 118 to determine further demographic information associated with each play request. For example, the reporting module 120 can access the consumer profiles database 116 to determine the age of the consumers who have made a request in a given geographic region. In another example, the reporting module 120 an access the consumer profiles database 116 to determine the gender of the consumers who have made a request for a specific media content file in a specific geographic region. Alternatively, the play logs database 118 can store information necessary for the reporting module to create reports and communicate the reports to one or more users requesting such reports. For example, the play logs database 118 can include associated consumer information in relation to each media request stored in the play logs database 118. In one example, a consumer's request for media content can be logged in the play logs database 118 as a single entry that contains information related to the media content requested by the consumer as well as consumer profile information associated with the consumer requesting the media content.

Once the play logs database 118 is populated with entries corresponding to media requests from one or more consumers, the reporting module 120 can interact with the interface module 110 to further allow users to view consumer's media access patterns. In addition, a user viewing media access patterns of consumers can also be a media consumer who views the media access patterns of consumers. Thus, for example, a user at the user computing device 122 can access the interface module 110 to request a report on consumer media access patterns in a specific geographic area. In one instance, the specific geographic area can be the Southern California area.

Upon receiving the reporting request, the reporting module 120 can formulate search criteria that include the Southern California area. For example, the reporting module 120 can be configured to search in specific zip codes that correspond to the Southern California region. Using this search criterion, the reporting module 120 searches and retrieves logging information in the play logs database 118. The relevant logged information can include one or more records of previous consumer media access patterns by consumers located in the Southern California area.

Once the reporting module 120 receives a list of relevant logged media requests, the reporting module 120 can then further filter this information in order to summarize the information into a list of relevant results that can then be provided to the user requesting the report. For example, the reporting module 120 can filter the retrieved data by age, gender, ethnicity and any other filtering criteria that the user provides. If the user is also a media consumer, the user can utilize the data contained in the report to access media in the future.

In another embodiment, the reporting module 120 can be configured to filter the relevant search results based on a period of time selected by the user. For example, the reporting module 120 can be configured with logic to search for media access patterns during a user-specified hour, day, week, or month.

While various databases have described herein, one skilled in the art will recognize that each of the aforementioned databases can be combined into one or more data repositories, and be located either locally or remotely. In addition, each of the aforementioned databases can be any type of data repository configured to store data and can be implemented using any methods of storage now known or to become known. Likewise, while various modules have described herein, one skilled in the art will recognize that each of the aforementioned modules can be combined into one or more modules, and be located either locally or remotely. Each of these modules can exist as a component of a computer program or process, or be standalone computer programs or processes recorded in a data repository.

Figure 2:
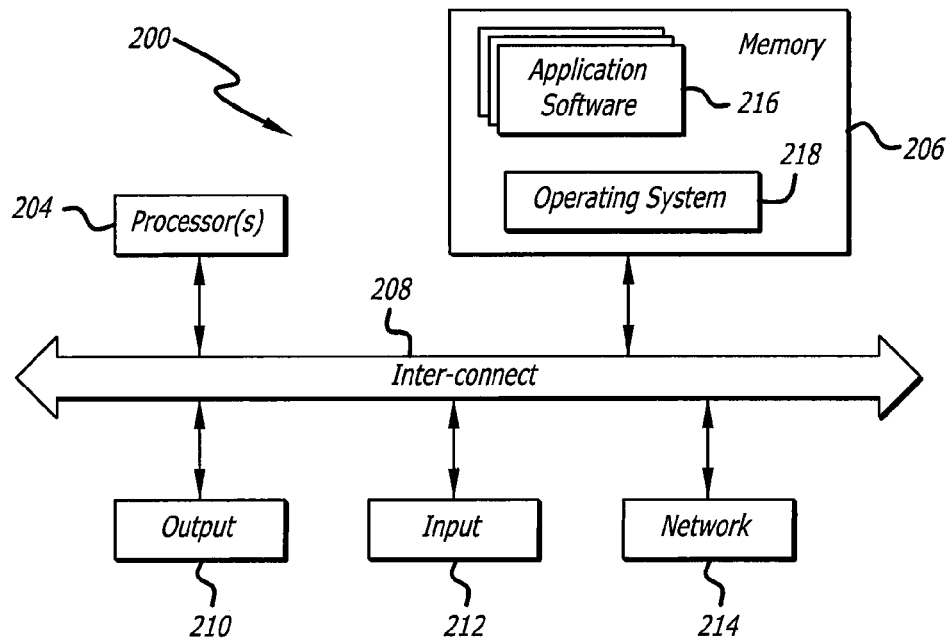
FIG. 2 depicts a component diagram of a data processing system according to one embodiment.

FIG. 2 depicts a component diagram of one example of a computing device 200. The user computing device can be utilized to implement one or more computing devices, computer processes, or software modules described herein. In one example, the user computing device 200 can be utilized to process calculations, execute instructions, and receive and transmit digital signals, as required by the user computing device 200. In one example, the user computing device 200 can be utilized to process calculations, execute instructions, and receive and transmit digital signals, as required by user interface logic, video rendering logic, decoding logic, or search engines as discussed below.

Computing device 200 can be any general or special purpose computer now known or to become known capable of performing the steps and/or performing the functions described herein, either in software, hardware, firmware, or a combination thereof.

Computing device 200 includes an interconnect 208 (e.g., bus and system core logic), which interconnects a microprocessor(s) 204 and memory 206. The interconnect 208 interconnects the microprocessor(s) 204 and the memory 206 together. Furthermore, the interconnect 208 interconnects the microprocessor 204 and the memory 206 to peripheral devices such as input ports 212 and output ports 210. Input ports 212 and output ports 210 can communicate with I/O devices such as mice, keyboards, modems, network interfaces, printers, scanners, video cameras and other devices. In addition, the output port 210 can further communicate with a display.

Furthermore, the interconnect 208 may include one or more buses connected to one another through various bridges, controllers and/or adapters. In one embodiment, input ports 212 and output ports 210 can include a USB (Universal Serial Bus) adapter for controlling USB peripherals, and/or an IEEE-1394 bus adapter for controlling IEEE-1394 peripherals. The interconnect 208 can also include a network connection 214.

The memory 206 may include ROM (Read Only Memory), and volatile RAM (Random Access Memory) and non-volatile memory, such as hard drive, flash memory, etc. Volatile RAM is typically implemented as dynamic RAM (DRAM), which requires continuous power in order to refresh or maintain the data in the memory. Non-volatile memory is typically a magnetic hard drive, flash memory, a magnetic optical drive, or an optical drive (e.g., a DVD RAM), or other type of memory system which maintains data even after power is removed from the system. The non-volatile memory may also be a random access memory.

The memory 206 can be a local device coupled directly to the rest of the components in the data processing system. A non-volatile memory that is remote from the system, such as a network storage device coupled to the data processing system through a network interface such as a modem or Ethernet interface, can also be used. The instructions to control the arrangement of a file structure may be stored in memory 206 or obtained through input ports 212 and output ports 210.

In general, routines executed to implement one or more embodiments may be implemented as part of an operating system 218 or a specific application, component, program, object, module or sequence of instructions referred to as application software 216. The application software 216 typically comprises one or more instruction sets that can be executed by the microprocessor(s) 204 to perform operations necessary to execute elements involving the various aspects of the methods and systems as described herein. For example, the application software 216 can include video decoding, rendering and manipulation logic.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media and optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

Figure 3:
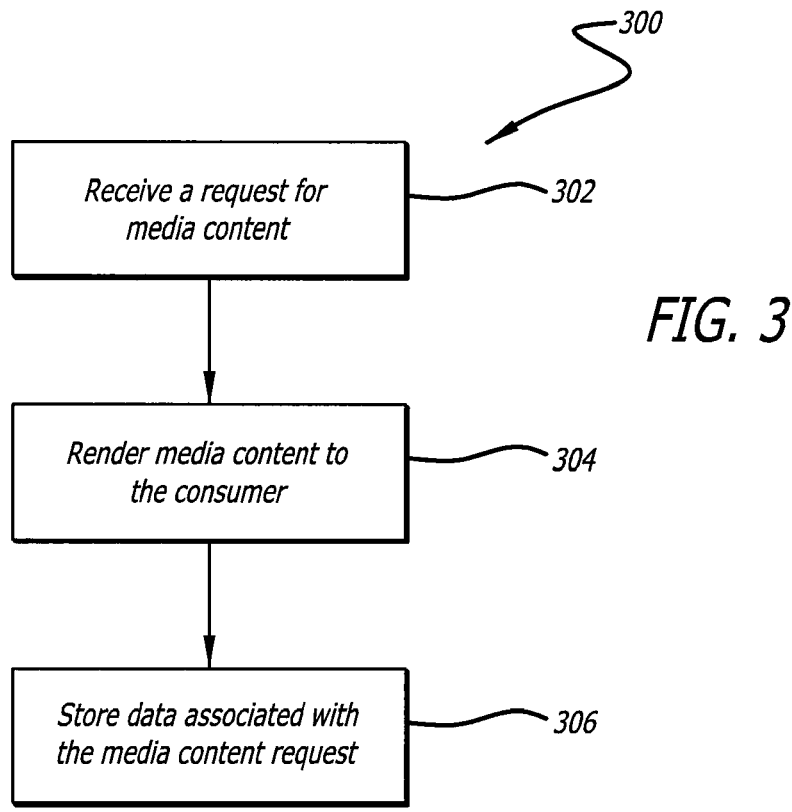
FIG. 3 depicts a flow diagram of a process for logging media access patterns according to one embodiment.

FIG. 3 depicts a flow diagram of a process 300 for logging media access patterns according to one embodiment. At process block 302, a request for media content is received from a media consumer. The consumer can utilize a media player such as iTunes, Windows Media Player or Yahoo! Music Jukebox, or any other media player available to request media content to be delivered to the user. The process 300 continues at process block 304. At process block 304, the media content is rendered to the consumer. As previously mentioned, a media rendering module 108 can be configured to retrieve media content from a media database 114 and can communicate the media content to the requesting consumer. The process 300 continues at process block 306.

At process block 306, data associated with the media access request is stored in the play logs database 118. The data stored in association with the media access request can include consumer profile data corresponding to specific characteristics of the consumer such as age, gender, ethnicity, etc. In addition, the data associated with the media access request can further include the time at which the media content was requested, the dynamic IP address associated with the consumer computing device 102 at which the consumer making the request was located, metadata associated with the media content, etc.

Consumer media access requests can be logged in the play logs database 118, and be utilized to report media access patterns of consumers. Users requesting consumers' media access patterns can request data regarding media access patterns for one or more purposes. For example, a user may request media access patterns in order to identify data for statistical analysis. In another example, a user may request media access patterns in order to be informed of the latest media selection in a predetermined geographic area, and access the most popular media in the predetermined geographic area. In yet another example, a media producer or artist can request media access patterns to establish the success rate of the media producer or artist.

Figure 4:
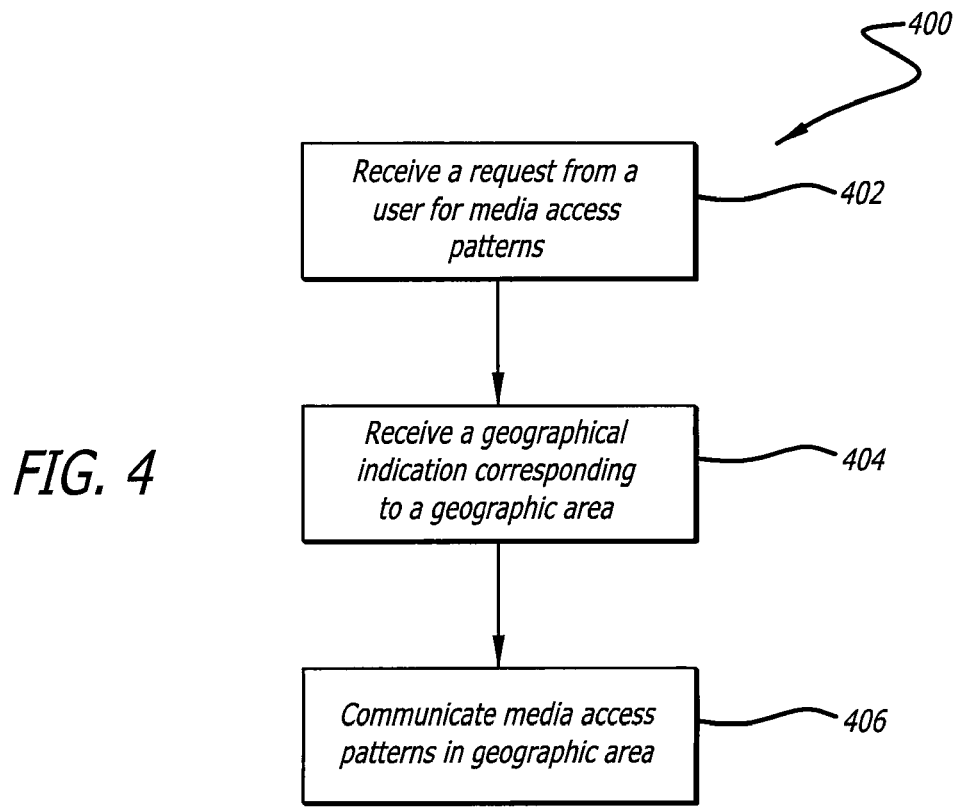
FIG. 4 depicts a flow diagram of a process for receiving a request for media access patterns.

FIG. 4 depicts a flow diagram of a process 400 for receiving a request for media access patterns according to one embodiment. At the process block 402, a request for media access patterns is received from a user. The request for media access patterns can be received in multiple manners. In one embodiment, the user request is received as a command via a website hosted by the media provider 106. In another embodiment, the request for media access patterns is received as an email message, URL request, or any other data communication mechanism that can be used by the user to submit a request via the user computing device 122 to user interface module 110. The process 400 continues at process block 404.

At process block 404, a geographic indicator corresponding to a geographic area is received. In one example, the geographic indicator can include a zip code. In another example, the geographic indicator can be an area code corresponding to a geographic area. In another example, the geographic indicator can be the name of a city or a metropolitan area corresponding to a geographic area. As such, the geographic indicator can be a combination of numbers or letters or any other alphanumeric combination that can be interpreted to indicate a predetermined geographic area. Process block 400 continues at process block 406.

At process block 406, the media access patterns are communicated to the user requesting the media access patterns. The media access patterns can be communicated utilizing a myriad of user interface elements, visual representations, or lists. For example, the media access patterns can be presented in the form of a top ten list in the geographic area selected by the user. The top ten list can comprise the media content that has been played the most or requested by the greatest number of consumers in the selected geographic area. The top ten list can then be saved as a playlist that the user can later access or share with other consumers. In another embodiment, media access patterns can be presented to the user in the form of a list of most popular artists in the geographic area. In another embodiment, media access patterns can be presented to the user in any other user interface, chart, or graph.

Figure 5:
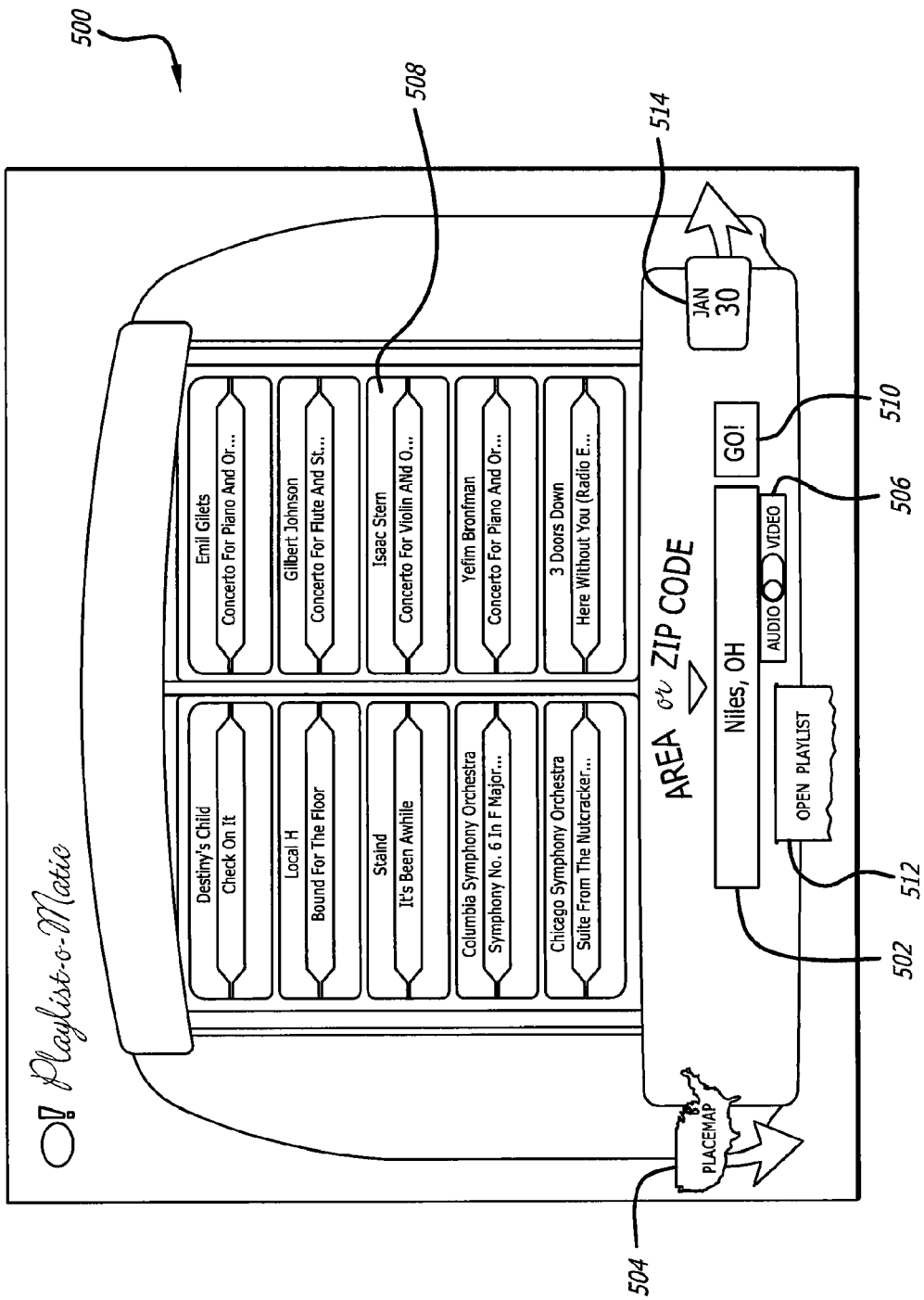
FIG. 5 depicts an exemplary user interface for requesting and viewing media access patterns in a geographic area according to one embodiment.

FIG. 5 depicts an exemplary user interface for requesting and viewing media access patterns in one or more zip codes according to one embodiment. In one embodiment, the user interface can be presented in the form of a jukebox such as interface 500.

In one embodiment, a text field 502 can be included in the user interface 500 to permit a user to enter one or more multiple zip codes. In one example, the user can enter one or more zip codes separated by a blank, comma, semicolon or any other punctuation mark that can delimit five digit zip codes. If a user enters more than one zip code, the total geographic area selected by the user would comprise all of the geographic areas corresponding to the zip codes entered by the user. Therefore, the media access patterns presented to the user would correspond to media access patterns in the total geographic area.

The user can enter the zip codes, or any other geographical identifier, using a panel of buttons that includes all of the decimal digits, and that the user can select using a pointer device such as a mouse. Alternatively, the user can simply utilize a mouse pointer or any other pointing device to place the cursor on the field 502 and utilize a keyboard to enter the zip code or any other geographic indicator in text field 502.

The user can enter other geographic indicators in text field 502. In one example, the user can enter the name or names of an area such as a city name and state/province name. In another example, the user can enter a map coordinate or coordinates such as latitude and longitude. In yet another example, the user can enter an area code indicative of a geographic area.

As such, when the user selects an execute button 510, the media access patterns are calculated for the zip codes or area codes entered in field 502. In one embodiment, if one zip code is entered into field 502, the playing patterns of the geographic area corresponding to the zip code entered into field 502 are utilized to calculate for example the top ten accessed media. By way of example, if a user enters zip code 85804, the top ten songs being played in zip code 85804 can be displayed in the top ten media list 508.

As mentioned above, if multiple zip codes are entered in field 502, the media access patterns of each zip code are accumulated in order to calculate the top ten songs being played cumulatively in the zip codes entered in field 502. For example, if the user enters zip codes 85210 and 85203, the playlist displayed in the top ten media list 508 can correspond to the media access patterns (e.g., the top ten songs) in the geographic area corresponding to zip codes 85210 and 85203. Alternatively, if the user selects to inquire regarding other types of media, the top ten media items accessed in the geographic area corresponding to zip codes 85210 and 85203 can be listed and presented to the user.

In another example, a user can enter the name of a city, such as Niles, Ohio. Upon a user selecting the execute button 510, the media access patterns of media consumers in the geographic region corresponding to the selected area can be displayed. Thus, for example, media access to music in Niles, Ohio can be displayed in the top ten media list 508. As previously discussed, media access patterns can include media content with the highest number of plays, media content with the highest number of consumers accessing such media content, media content with the highest consumer ratings etc.

User interface 500 can further comprise an open playlist button 512. The open playlist button 512 can permit a user to copy the top ten media list 508 being displayed to a local music player such as the Yahoo! Music Jukebox or any other media player associated with user interface 500. The top ten list can be played immediately or saved as a playlist in the media player associated with user interface 500. In one example, the playlist can be generated as a result of determining the media access patterns of a specific zip code and can be saved for the user's future use and enjoyment. A user, therefore, can copy the generated playlist, and access the media in the generated playlist as any other media consumer. The user can travel to a destination, for example within the United States, and determine the media access patterns in the specific city that the user is visiting. Thus, the user can immediately be apprised of the media that is most popular and the likes and dislikes of local users in the geographic area.

In a further embodiment, user interface 500 can include a select area button 504 that can permit a user to enter a user-defined or customized geographic area that is not necessarily associated with a zip code, area code or any other standard geographic indicator. For example, the select area button 504 can permit a user to enter a specific area in a map displayed for the user to select or in a list of cities of the world.

In a further embodiment, the user interface 500 can include a select media type button. For example, the button 506 permits a user to select between audio and video media types. If the user selects the audio media type, the media listed in the top ten media list 508 can correspond to music or other audio media accessed at the selected geographic region. If the user selects the video media type, the media listed in the top ten media list 508 can correspond to video media accessed at the selected geographic region. Other media types can also be utilized. For example, news stories read, stock symbols looked-up, stock charts viewed, sports teams searched, sports scores viewed, TV episode synopses read, movie review pages read, movie trailers played, etc.

In yet another embodiment, the user interface 500 can include a select date range button 514. Thus, a user is provided with the ability to select the time in which the media access patterns are determined. Various user interfaces can be provided in order to allow a user to select one or more dates or date ranges. In addition, the user can be provided with the option of selecting one or more time ranges or time periods. For example, a Monday afternoon, from 2 PM to 6 PM can be selected as the time range. In another embodiment, season time periods can be selected by the use. For example, the user can select the Summer of a specified year in order to determine media access patterns during that time.

In one embodiment, the user can select a date range by selecting a day or days in a calendar user interface that displays a month view, a week view or any other view that allows a user to circle the days selected by the user. For example, a calendar monthly view can be presented as a user interface to the user once the user selects button 514. The calendar monthly view can permit a user to circle a day or days in the month that the user would like to select.

In another embodiment, a user may utilize a day slider having a range of one to thirty-one, corresponding to the days of the month. In another example, the slider can have a range of one to three hundred and sixty-five, representing all the days in the current year. If the user wants to select a different month, the user can select a specific month using a second slider.

Once a user selects a date range, the media access patterns can be calculated and displayed according to one or more options set by the user. As previously discussed, the user can select to receive the display of the top media items being accessed during the time in which the user has indicated. In addition, the top ten media items provided to the user are calculated based on the geographic indicator provided by the user, such as zip code, area code, or any other geographic delimiter. Furthermore, if no date or period of time is selected by the user, the default date can be set to be the current date. Other user interface mechanisms can further be provided to a user in order to receive user input that indicates the date and time that the user wants to use in order to determine the media access patterns.

Figure 6:
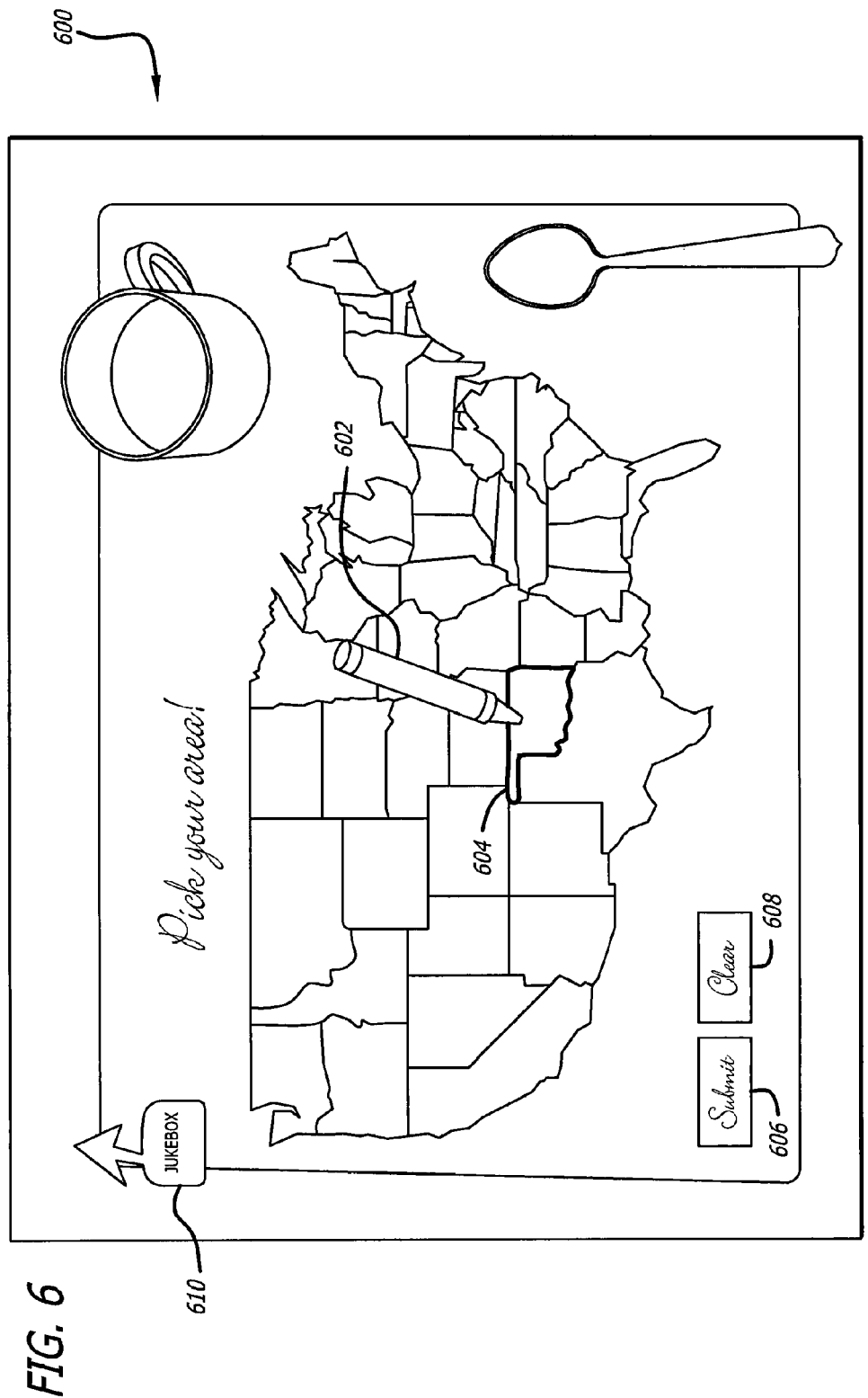
FIG. 6 depicts an exemplary user interface for selecting a customized area according to one embodiment.

FIG. 6 depicts an exemplary user interface 600 for selecting a customized geographic area according to one embodiment. User interface 600 can include a cursor 602 that can be utilized to select an area in a map. In one embodiment, user interface 600 can be a visual representation of a placemat provided in a restaurant. The placemat can further include a map of a country, state, or a geographic region in general. The cursor 602 can be a visual representation of a crayon, and can be utilized as a pointing device cursor. For example, the cursor 602 can be a mouse cursor. In one example, the user can utilize cursor 602 to draw a geographic indicator in the shape of a closed curve 604, such as around the border of a state of the United States of America. Once the user has indicated or provided one or more geographic indicators in the user interface 600, the user can select a submit button 606. After selecting the submit button 606, the user can be provided with a user interface that displays media access patterns corresponding to the selected geographic area. For example, media access patterns can be utilized to generate a list of the top ten media items that are accessed in the specific area designated by the user. As such, the submit button 606 can be provided as part of the interface module 110 and further communicate with the reporting module 120 in order to calculate the media access patterns in the geographic area identified by geographic indicator 604.

The user interface 600 can also include a clear button 608 which can be selected by a user in order to clear any drawings that the user might have done on the map displayed in user interface 600. In addition, a redirection button 610 can be provided so that the user can select to return to the jukebox interface.

Figure 7:
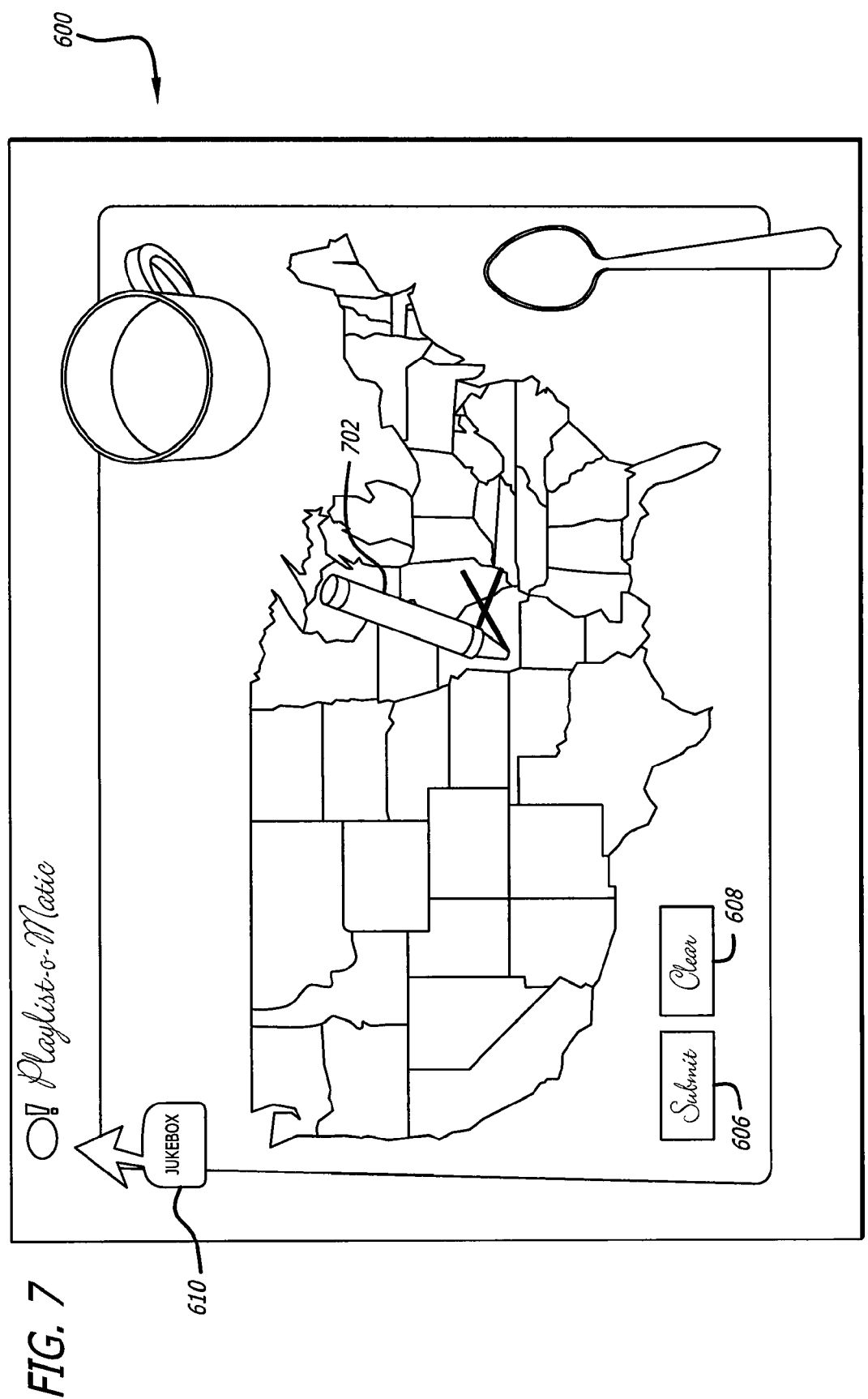
FIG. 7 depicts an exemplary user interface for selecting a customized area according to another embodiment.

FIG. 7 depicts an exemplary user interface 700 for selecting a customized geographic area according to another embodiment. The user interface 700 can permit a user to select one or more points on the map of user interface 700. In one embodiment, the user can utilize cursor 702 in order to indicate a point on the map. For example, the user can utilize the cursor 702 to draw an "X" on a map of the United States of America to select a predefined region in the map by simply clicking anywhere in the region in the map. In one embodiment, the point established by the "X" mark can be mapped to a latitude and longitude and establish an area around the latitude and longitude location. For example, a circular area of a given radius around the marked point can be established to be the geographic area selected by the user. In another example, the zip code closest to the latitude and longitude location can be selected. In yet another example, the county or state in which the "X" is marked can be selected.

In another example, the map can be divided into regions corresponding to area codes. The user can then click anywhere in a region indicative of an area code in order to select the corresponding geographic region. In yet another example, the map can be divided into regions corresponding to zip codes. The user can then click anywhere in a region indicative of a zip code in order to select the corresponding geographic region.

Figure 8:
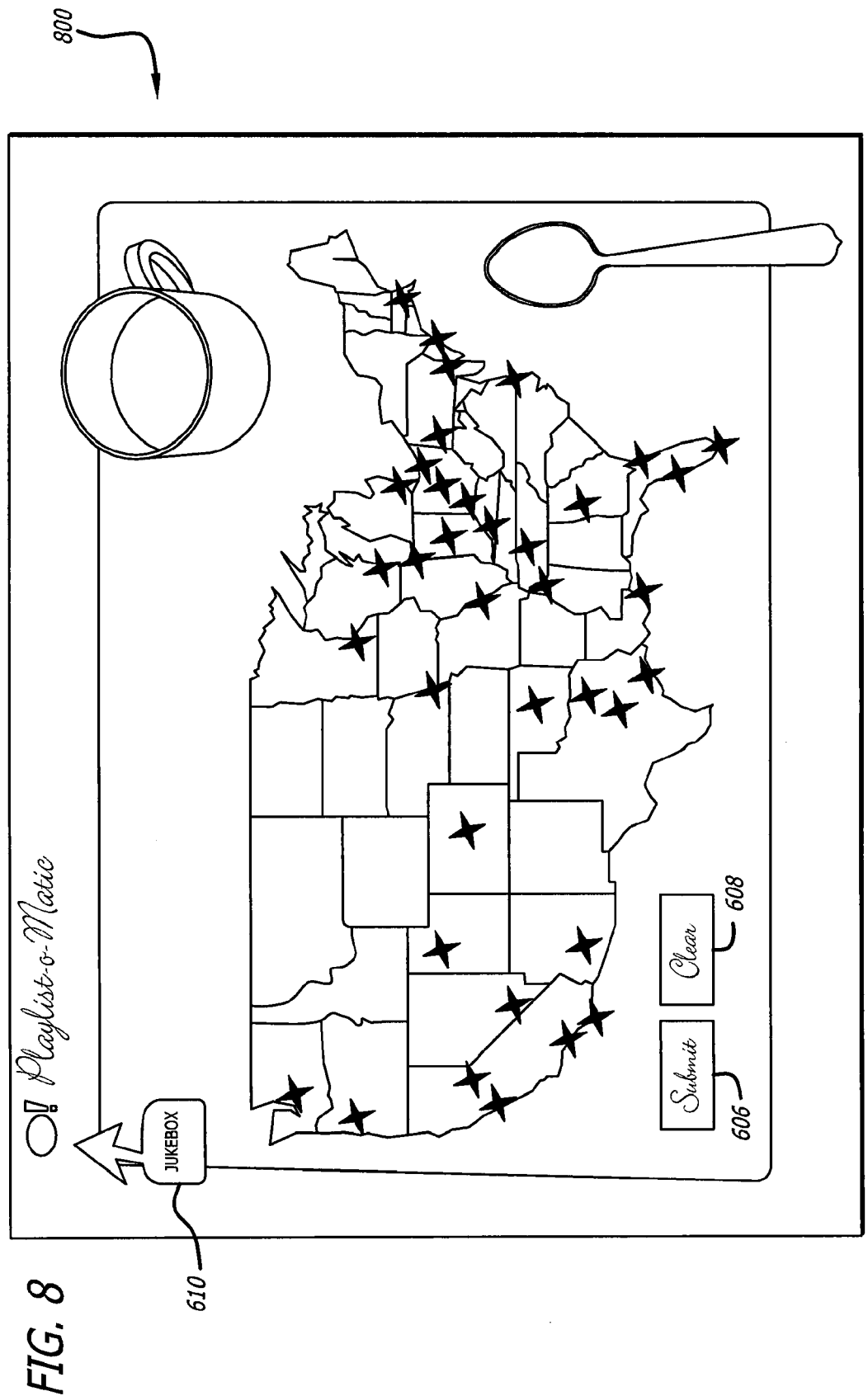
FIG. 8 depicts an exemplary user interface for selecting a customized area according to yet another embodiment.

FIG. 8 depicts an exemplary user interface 800 for selecting a customized area according to yet another embodiment. The user can select a metropolitan area or city on the map of user interface 800. As such, the map displayed as part of user interface 800 can indicate cities representing greater metropolitan areas, such as Neilsen DMA's ("Demographic Metropolitan Areas") or U.S. Government MSA's ("Metropolitan Statistical Areas"). The user can then simply click on a city indicator in order to select the corresponding greater metropolitan area. For example, if the user selects city indicator 802, the user selects the city of San Francisco in order to view media access patterns. The indicator 802 can be presented using various forms of visual representations and/or symbols such as a star shape.

Figure 9:
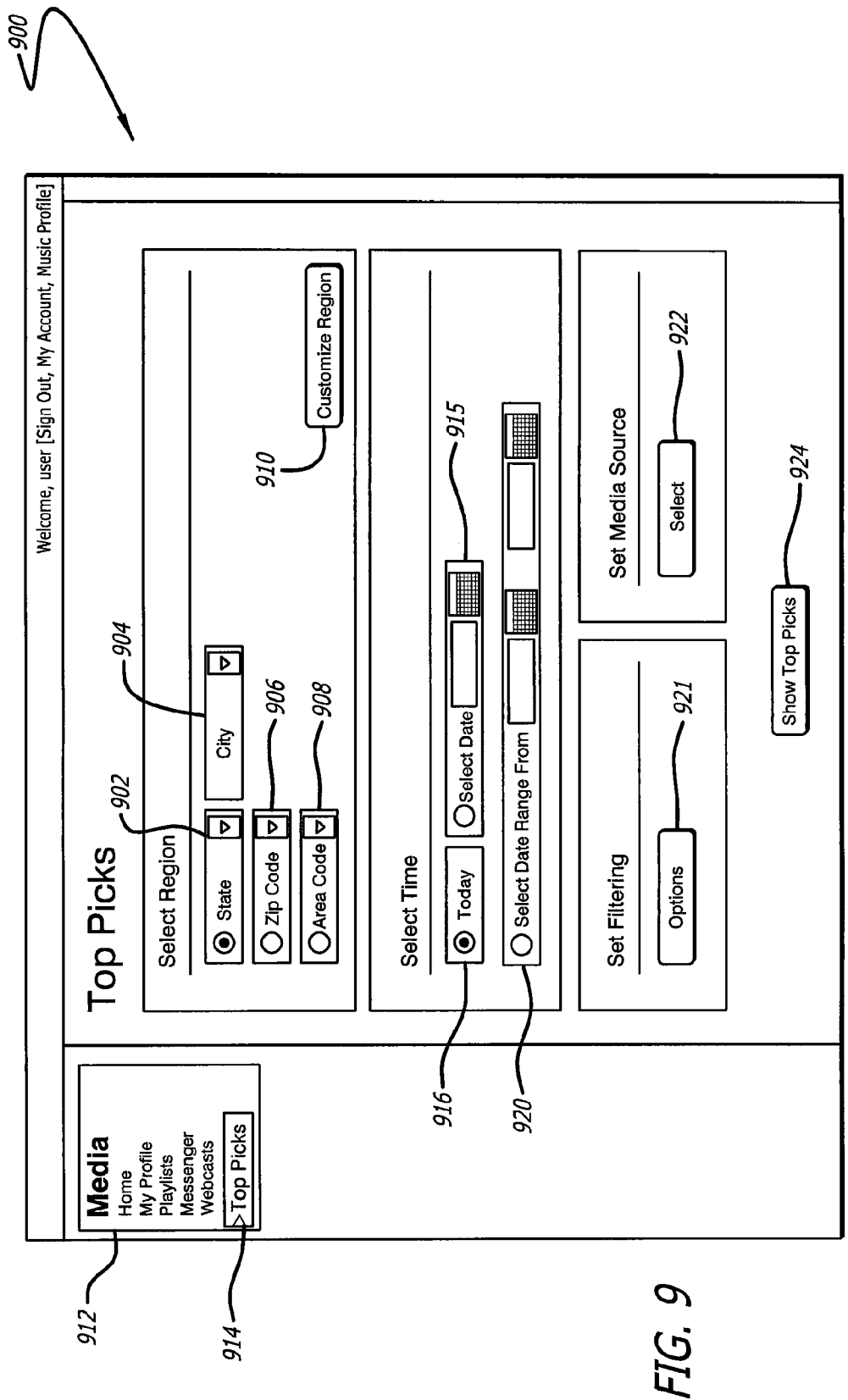
FIG. 9 depicts an exemplary user interface for requesting media access patterns according to one embodiment.

FIG. 9 depicts an exemplary user interface for requesting media access patterns according to one embodiment. User interface 900 can include a user menu 912 that includes a menu item 914 to select media top picks. In other embodiments, different menu items in menu 912 allow a user to access media.

User interface 900 depicts a user interface that one or more users can utilize to access the media provider 106 and request consumer media access patterns such as the top picks of music and/or video. In one example, the top picks refer to selections of media that are popular among media consumers in a specific geographic region. Thus, a user can first select a geographic area from which the user selection patterns are to be determined.

In one embodiment, a drop-down menu 902 can be provided to a user in order to select a state. As an optional menu selection, a drop-down menu 904 can be provided to the user to enter a city. In one example, a user can select only one state by selecting the state in the drop-down menu 902 and not select a city from the drop down menu 904. If the user only selects the state in the drop-down menu 902, the media access patterns calculated will correspond with the state selected by the user in drop-down menu 902. In another example, the user can further select a city and determine consumer media access patterns in the selected city. For example, a user may select in the state drop-down menu 902 the state of Texas, and in the city drop-down menu 904, the city of Dallas. This combination allows the user to provide a further degree of granularity in the selection of a geographic area.

In another embodiment, a drop-down menu 906 can be provided to a user so that a user can alternatively select a zip code as a geographic indicator. In one example, the user can select the zip code from a list of zip codes. In another example, the user can type in a zip code number.

In yet a further embodiment, a drop-down menu 908 can be provided to a user to enter an area code. The user can enter an area code as a geographic indicator corresponding to a geographic area from which consumer selection patterns are determined.

The user interface 900 can further provide a button 910 that can be utilized by a user to customize the selected region and provide a geographic indicator that is unique to the user. For example, upon selecting the button 910, the user interface 700 can be displayed in order to permit the user to select a specific area in a map. Thus, a user can draw a point or a polygon or any boundary around a geographic area that the user wants to utilize to determine media access patterns.

The user interface 900 can also include a section for selecting a time period from which the consumer media access patterns are determined. For example, the user may select radio button 916 that simply selects the current date as the selected time period. Therefore, upon selecting the radio button 916, the results provided to the user will correspond to the media access patterns of the day that the user requests to view the media access patterns.

In another example, the user can select radio button 915 that allows the user to input a specific date. Thus, the user can enter any date in a provided text field, or select a calendar icon that allows the user to visually pick a date in a calendar. As previously discussed, the calendar can have a weekly or monthly view. The user can then select a date displayed in the calendar.

In another example, the user can select radio button 920 to select a date range that can permit a user to enter a starting date and an ending date. The media access patterns that are calculated and presented to the user can therefore be limited to the period of time established by the starting date and the ending date as entered by the user in radio button 920.

In addition, the media access patterns provided by the user can further be filtered by filtering settings that a user can establish through options button 921. Filtering settings can include filtering by age, gender, ethnicity or any other demographical characteristics of users that access media from the media provider 106. Thus, by way of non-limiting example, other demographic characteristics can include language spoken, income range, occupation, marital status, etc.

In another embodiment, a user can further be provided with the ability to select the media source corresponding to the media access patterns that are to be determined. Thus, the button 922 is provided as part of the user interface 900 to allow users to select one or more media sources in order to determine user media access patterns. In one example, the media access patterns can include media access patterns of a web cast or radiocast, the usage of which can be recorded by the logging module 112. For instance, the user can determine the consumer media access patterns of an online radio channel and find out the number of consumers who access the online radio channel in a predetermined geographic area as selected by the user.

In another example, the media source can be an online music engine such as the Yahoo! Music Jukebox, which permits consumers to download music files. For instance, the user can select as the media source an online music store and determine the most popular downloaded songs in a specific geographic region.

As previously discussed, the media access patterns determined for a specific geographic region can be presented to the user in multiple ways. In one example, the user may select to receive a listing of the top ten media items (e.g., literary works, images, videos) accessed in a geographic area. In another example, the user may select to receive a listing of the top ten songs, top twenty songs or top forty songs of a specific music channel or music store in a geographic area. In yet another example, the media access patterns can be presented in the form of a generated playlist comprising the top songs in the geographical area.

According to the user interface 900, the user can receive the top picks of the specific region selected during a specific period of time and according to the filtering options and media source options selected by the user by clicking button 924. The top picks can comprise a list of media items that have been accessed by the largest number of consumers in that specific region as selected by the user. In this manner, a user can select a region and immediately know which media items are the top ten favorite media items in that geographic region.

Figure 10:
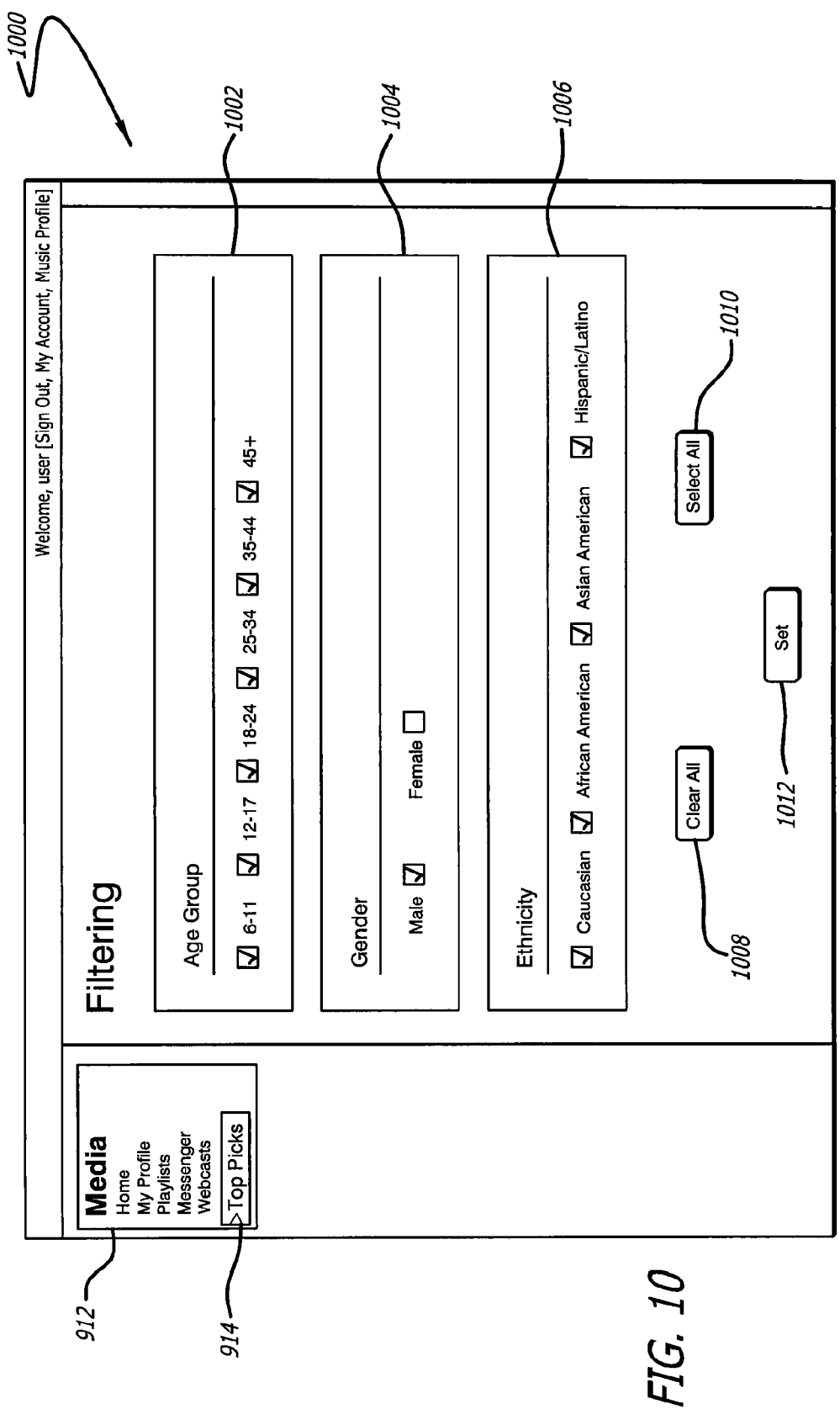
FIG. 10 depicts an exemplary user interface for requesting filtering of media access patterns.

FIG. 10 depicts an exemplary user interface for requesting filtering of media access patterns results. User interface 1000 can be displayed once the user selects the options button 921 in the user interface 900. In one embodiment, user interface 1000 can include an age group pane 1002 that can include a plurality of checkboxes that a user can check or uncheck in order to select specific age groups to be filtered from the results of the media access patterns. The checkboxes provided can be presented to the user in one or more user interface mechanisms. For example, a checkbox for the ages 6-11, 12-17, 18-24, 25-34, 35-44 and 45 and up can be provided such that the user can check or uncheck each of the age groups to obtain media access patterns of consumers of a certain age group. For example, if the user is interested in finding out the media access patterns of teenagers in a specific geographic area, the user can select the geographic area and further filter the results by checking only the age group 12-17 and unchecking all the other age groups. Thus, the media access patterns of consumers in the age group of 12-17 will be taken into consideration and media access patterns of consumers of any other age will not be taken into consideration. As previously mentioned, the logging module 112 can access consumer profiles at the time of logging a request for media such that when an entry is logged for a specific media request, characteristics of the consumer (e.g. age) requesting the media can also be included the logged request. Then, age can be a criterion used when searching in the play logs database 118. It should be apparent to one skilled in the art that other age groupings may also be utilized and in addition that a specific age group can also consist of, for example, users of the same age. Therefore, an exemplary group can be for example a group of only twenty-one-year-olds, thirty-year-olds, etc.

In another embodiment, the user interface 1000 can further include a gender pane 1004. The gender pane 1004 can also include checkboxes that permit a user searching for media access patterns to check or uncheck male and female checkboxes. As previously discussed, the filtering for gender can permit a user to select, for example, music or video that male consumers in a specific geographic region have demonstrated an interest in. Likewise, the gender pane 1004 can permit a user to only check the female checkbox, so as to select the filtering of media access patterns of female consumers in a specific geographic region. Of course, the gender boxes provided in the gender pane 1004 can be utilized in combination with the checkboxes in the age group pane 1002 so as to permit a user to filter media access patterns according to age group in combination with a specific gender. In one example, a user may select the filtering of media access patterns of males in the age group of 25-34 years old.

In yet a further embodiment, an ethnicity pane 1006 can include one or more checkboxes that list different ethnic groups that can be selected by the user. For example, a Caucasian ethnic group and an African American ethnic group, an Asian American ethnic group, and a Hispanic/Latino ethnic group can be provided to the user in order to select a specific ethnicity group to determine the media access patterns of consumers in one or more ethnic groups. As previously mentioned, the filtering of media access patterns can be a combination of the selected age group, gender and ethnicity. Thus, in one example, a user may select to receive media access patterns of Hispanic users that are female and fall under the age group 12-17 years old.

Furthermore, as previously discussed, media access patterns can be presented to users in the form of a top five or top ten list which reflect the media items (e.g., songs, videos) that are played the most in the selected geographic region. In another embodiment, the media access patterns can be provided as a list of top ten or top five artists that are selected in a specific geographic region. In yet another embodiment, the top ten or top five albums can be displayed as part of the media access patterns in a specific geographic region. In yet another embodiment, each genre can be displayed along with the number of songs that have been downloaded, played or streamed for that specific genre.

Once the user has set all of the filtering options by checking or unchecking the provided checkboxes of user interface 1000, the user can set the filtering options by selecting the set button 1012. In addition, a clear all button 1008 and a select all button 1010 can be provided in an effort to facilitate the selection of checkboxes or deselection of checkboxes. For example, the clear all button 1008 can uncheck all of the checkboxes and therefore permit a user to, for example, only check one or two checkboxes in the age group pane 1002, the gender pane 1004, or the ethnicity pane 1006. In another example, the select all button 1010 can facilitate the checking of all the checkboxes in the user interface 1000 and further permit the user to uncheck one or two checkboxes that the user does not want to include as part of filtering the media access patterns calculated for the geographic region as selected by the user.

Figure 11:
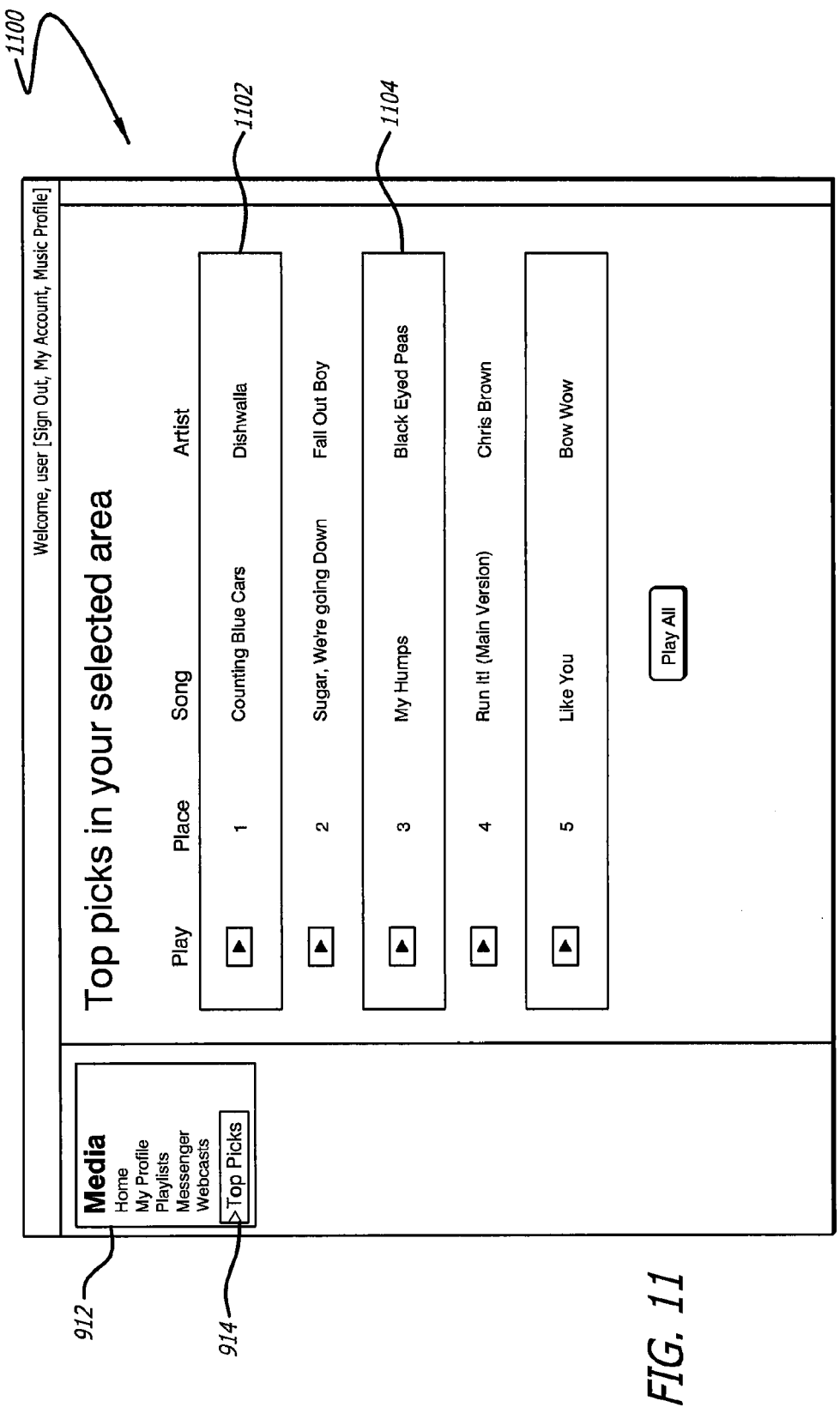
FIG. 11 depicts an exemplary user interface for viewing media access patterns according to one embodiment.

FIG. 11 depicts an exemplary user interface 1100 for viewing media access patterns according to one embodiment. User interface 1100 lists the top five songs being accessed by consumers in the specific geographic region selected by the user. Therefore, in one example, user interface 1100 can be displayed once the button 924 as depicted in FIG. 9 is selected by the user. Again, the media access patterns of the geographic region selected by the user can be displayed for example in the form of the top ten or top five songs. Thus, for example, the top five songs shown in FIG. 11 are songs that have been logged to have been accessed or downloaded by the largest number of consumers in the geographic region selected by the user. Thus, for example, media item 1102 corresponds to the song that was accessed or listened the most in the selected geographic area. In another example, media item 1104 corresponds to the third most listened are accessed song in the geographic region selected by the user. User interface 1100 is exemplary only, and can be used for media types other than songs.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware, software or firmware, and individual functions can be distributed among software applications at either the client or server level or both. In this regard, any number of the features of the different embodiments described herein may be combined into single or multiple embodiments, and alternate embodiments having fewer than or more than all of the features herein described are possible.

Functionality may also be, in while or in part, distributed among multiple components, in manners now known or to become known. Thus, myriad software/hardware/firmware combinations are possible in achieving the functions, features, interface and preferences described herein. Moreover, the scope of the present disclosure covers conventionally known manners for carrying out the described features, functions and interfaces, and those variations and modifications that may be made to the hardware, software or firmware components described herein as would be understood by those skilled in the art now and hereafter.

The invention claimed is:

1. A method comprising:
receiving media access requests for a plurality of media items from a plurality of consumers associated with at least one geographic area;
storing a number of requests for each media item from the plurality of consumers, the number of requests stored with the plurality of media items in a logging database associated with a storage medium, each stored request comprising information related to the requested media item and information related to the requesting consumer supplemented with at least one geographic area associated with the requesting consumer;
providing each of the plurality of media items to consumers requesting the media items;
receiving a geographic indicator from a user, the geographic indicator being representative of a geographic area;
identifying, via at least one processor of a computing device, a media item identifier corresponding to a highly-requested media item having the greatest number of media access requests from consumers in the geographic area based in part on the information within the stored requests; and
communicating the identified media item identifier to the user over a network.

2. The method of claim 1, wherein the geographical indicator is a zip code.

3. The method of claim 1, wherein the geographical indicator is an area code.

4. The method of claim 1, further comprising generating a list of media item names, the list being ordered based on the number of media access requests of each of the media items in the list.

5. The method of claim 4, further comprising generating a playlist based on the list of media item names.

6. The method of claim 1, further comprising receiving a date range selection from the user, the date range being utilized to identify the media item identifier such that the media item identifier corresponds to a highly-requested media item having the greatest number of media access requests from consumers during the date range.

7. The method of claim 1, further comprising receiving a demographic filtering selection from the user, the demographic filtering selection being utilized to identify the media item identifier such that the media item identifier corresponds to a highly-requested media item having the greatest number of media access requests from consumers having demographic characteristics as provided by the demographic filtering selection.

8. The method of claim 1, wherein the media item is audio, video, image, or text.

9. A method comprising:
receiving, at a computing device, a geographic indicator from a user, the geographic indicator being representative of a geographic area;
identifying, via a processor of the computing device, a song identifier corresponding to a song having the greatest number of media access requests from a plurality of consumers associated with the geographic area, said song identified from a logging database that stores media access requests with the media being requested, each stored media access request comprising information related to a requested song and information related to the requesting user supplemented with at least one geographic area associated with the requesting user, wherein said song is identified based in part on the information within the stored media access requests; and
communicating, via a processor of the computing device, the identified song identifier to the user.

10. The method of claim 9, further comprising determining whether a consumer from the plurality of consumers is associated with the geographic area if an Internet address associated with a computing device being utilized by the consumer corresponds to the geographic area.

11. The method of claim 9, further comprising determining whether a consumer from the plurality of consumers is associated with the geographic area if a profile of the consumer includes geographic data related to the geographic area.

12. The method of claim 9, further comprising:
identifying a second song identifier corresponding to a second song having the second greatest number of media access requests, and
communicating the second song identifier to the user.

13. The method of claim 9, wherein the geographical indicator is a latitude and longitude coordinate, a zip code, an area code, or a city identifier.

14. The method of claim 13, further comprising assembling the song and the second song as part of a playlist.

15. The method of claim 14, further comprising communicating an identifier of the playlist to the user.

16. The method of claim 9, wherein identifying the song identifier further comprises identifying the song identifier corresponding to a song having the greatest number of media access requests during a predetermined amount of time.

17. The method of claim 9, wherein identifying the song identifier further comprises identifying the song identifier corresponding to a song having the greatest number of media access requests from a plurality of consumers of a predetermined age.

18. The method of claim 9, wherein identifying the song identifier further comprises identifying the song identifier corresponding to a song having the greatest number of media access requests from a plurality of consumers of a predetermined gender.

19. A system comprising:
a plurality of processors;
a logging module, implemented by at least of the plurality of processors, that stores media access requests with a plurality of media items in a logging database associated with a computer-readable storage medium, the media access requests being received from a plurality of consumers associated with a geographic area over a network, each stored media access request comprising information related to requested media items and information related to requesting consumers supplemented with at least one geographic area associated with each requesting consumer;
a reporting module, implemented by at least of the plurality of processors, that receives a geographic indicator from a user over the network, the geographic indicator representative of the geographic area, the reporting module further identifies a media item identifier corresponding to a media item among the plurality of media items having the greatest number of media access requests in the logging database based in part on the information within the stored media item requests; and
a user interface module, implemented by at least of the plurality of processors, that communicates the identified media item identifier to the user over the network.

20. The system of claim 19, wherein the geographical indicator is a city identifier.

21. The system of claim 19, wherein the geographical indicator is a zip code.

22. The system of claim 19, wherein the geographical indicator is an area code.

23. The system of claim 19, wherein the reporting module is configured to identify the media item identifier such that the media item identifier corresponds to a highly-requested media item having the greatest number of media access requests from consumers during a date range.

24. The system of claim 19, wherein the reporting module is configured to identify the media item identifier such that the media item identifier corresponds to a highly-requested media item having the greatest number of media access requests from consumers having demographic characteristics as provided by the demographic filtering selection.

* * * * *